United States Patent
Berube et al.

(10) Patent No.: US 9,450,825 B2
(45) Date of Patent: Sep. 20, 2016

(54) MANAGING SETTINGS OF COMPUTING DEVICES

(75) Inventors: Steve Berube, Sandown, NH (US);
Travis S Tripp, Fort Collins, CO (US);
Keith Kuchler, Fort Collins, CO (US);
Madhu Kanoor, Parsippany, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 345 days.

(21) Appl. No.: 12/907,605

(22) Filed: Oct. 19, 2010

(65) Prior Publication Data

US 2012/0096135 A1     Apr. 19, 2012

(51) Int. Cl.
| | |
|---|---|
| *G06F 15/173* | (2006.01) |
| *H04L 12/24* | (2006.01) |
| *H04L 29/08* | (2006.01) |
| *G06F 9/445* | (2006.01) |
| *G06F 9/44* | (2006.01) |

(52) U.S. Cl.
CPC ....... *H04L 41/0843* (2013.01); *G06F 9/44505* (2013.01); *H04L 41/08* (2013.01); *H04L 41/0803* (2013.01); *H04L 67/30* (2013.01); *G06F 9/4411* (2013.01)

(58) Field of Classification Search
CPC .............. H04L 41/0843; H04L 41/08; H04L 41/0803; H04L 67/30; G06F 9/4411; G06F 9/44505
USPC ...................................... 709/220, 223; 718/1
See application file for complete search history.

(56) References Cited

U.S. PATENT DOCUMENTS

| | | | |
|---|---|---|---|
| 7,434,211 B2* | 10/2008 | Wynn ................... | G06F 9/4418 714/38.14 |
| 7,487,231 B2 | 2/2009 | Brown et al. | |
| 7,698,639 B2* | 4/2010 | Kamdar et al. ............... | 715/235 |
| 2004/0204949 A1 | 10/2004 | Shaji et al. | |
| 2005/0278723 A1 | 12/2005 | Feinleib et al. | |
| 2008/0086546 A1* | 4/2008 | Lu et al. ........................ | 709/220 |
| 2009/0094521 A1* | 4/2009 | Hung et al. ................... | 715/736 |
| 2010/0299719 A1* | 11/2010 | Burks et al. ...................... | 726/3 |

FOREIGN PATENT DOCUMENTS

TW     200513888     4/2005

* cited by examiner

*Primary Examiner* — Jungwon Chang
(74) *Attorney, Agent, or Firm* — Brooks, Cameron & Huebsch, PLLC

(57) ABSTRACT

The present disclosure includes methods, systems, and machine readable and executable instructions and/or logic for managing settings of computing devices. An example method includes receiving a platform-independent template for managing settings of a plurality of applications or operating systems of a computing device, creating, based on the received template, a profile for managing settings of one of the plurality of applications or operating systems of the computing device, deploying the created profile to the computing device to manage the settings of the one application or operating system of the computing device, and receiving a report on whether the settings of the one application or operating system of the computing device were successfully managed by the created profile.

19 Claims, 4 Drawing Sheets

MANAGING SETTINGS OF COMPUTING DEVICES

BACKGROUND

The settings of applications and operating systems of computing devices in a network can be managed (e.g., controlled and/or changed) from a centralized administrative interface. For example, an administrator can log in to a computing device in a network via a centralized administrative interface and use login scripts to manage the settings of the applications and/or operating system of the computing device. However, such a process may be highly customized and/or unique to that particular computing device. That is, the administrator may be forced to log in to different computing devices in the network individually and use different login scripts to manage the settings of applications and operating systems of the different computing devices. Accordingly, such a process may be complex and/or time consuming for the administrator. Further, the administrator may not be able to determine whether the settings of the application and/or operating system of the computing device were successfully managed by the login scripts. That is, the administrator may not be able to enforce the management of the settings.

As an additional example, an administrator can deploy an administrative template to computing devices in a network via a centralized administrative interface, and the deployed template can manage the settings of the applications and/or operating systems of the computing devices. However, because of the architecture of the administrative template, the template may only be able to manage the settings of one type of application or operating system of the computing devices. For instance, the administrative template may only be able to manage registry settings. Further, the administrator may not be able to adjust the parameters of the administrative template. That is, the administrator may not be able to customize the administrative template for different computing devices in the network. Additionally, the administrator may not be able to determine whether the settings of the applications and/or operating systems of the computing devices were successfully managed by the administrative template. That is, the administrator may not be able to enforce the management of the settings.

DETAILED DESCRIPTION

Figure 1:
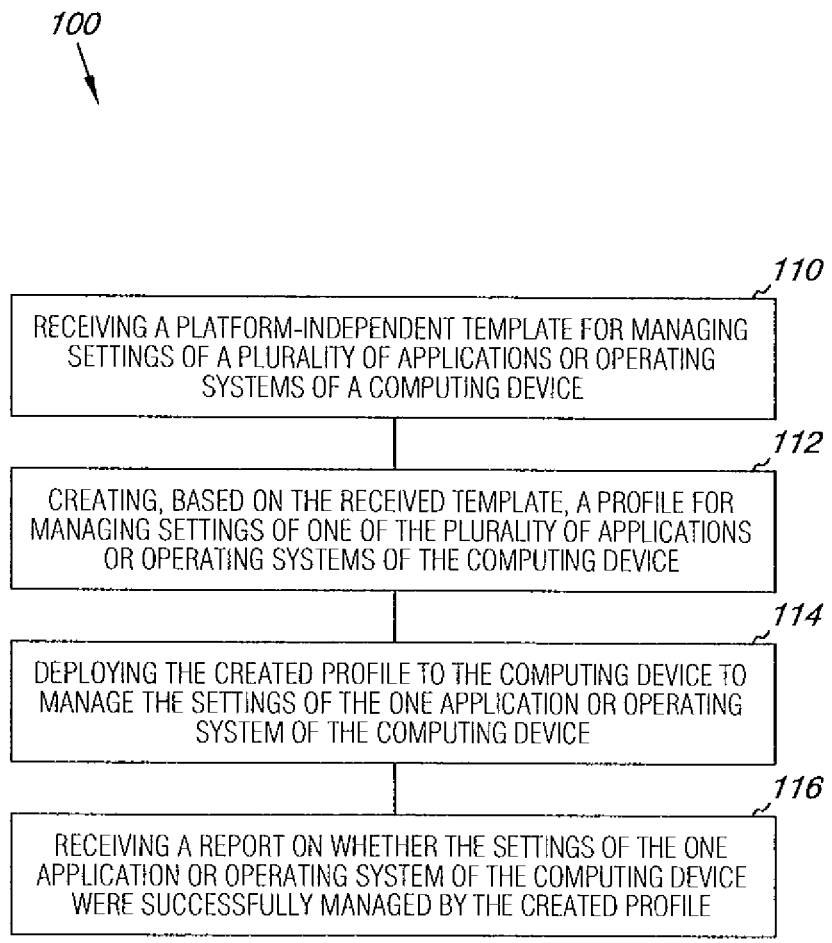
FIG. 1 provides a flow chart illustrating an example of a method for managing settings of a computing device according to the present disclosure.

The present disclosure includes methods, systems, and machine readable and executable instructions and/or logic for managing settings of computing devices. An example method includes receiving a platform-independent template for managing settings of a plurality of applications or operating systems of a computing device, creating based on the received template, a profile for managing settings of one of the plurality of applications or operating systems of the computing device, deploying the created profile to the computing device to manage the settings of the one application or operating system of the computing device, and receiving a report on whether the settings of the one application or operating system of the computing device were successfully managed by the created profile.

The settings of a plurality (e.g., any type) of applications or operating systems of a computing device can he managed in accordance with the present disclosure. Further, settings management in accordance with the present disclosure can be customized for different computing devices. Additionally, settings management in accordance with the present disclosure can include determining whether the settings of an application or operating system of a computing device have been successfully managed and/or enforcing the managing of the settings. Further, settings management in accordance with the present disclosure can be less complex and/or less time consuming than previous settings management approaches.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice he examples of this disclosure, and it is to be understood that other examples may be utilized and that process, electrical, and/or structural changes may be made without departing from the scope of the present disclosure. As used herein, the designator "N," particularly with respect to reference numerals in the drawings, indicates that a number of the particular feature so designated can be included with examples of the present disclosure. The designators can represent the same or different numbers of the particular features.

Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 provides a flow chart illustrating an example of a method 100 for managing (e.g., controlling and/or changing) settings of a computing device according to the present disclosure. The computing device whose settings are managed can be, for example, a computing device 368-1, 368-2, . . . , 368-N described further herein in connection with FIG. 3.

As shown in FIG. 1, method 100 includes receiving 110 a platform-independent template for managing settings of a plurality (e.g., any type) of applications or operating systems of a computing device. The template can be received in a single file by a subsystem from a template source via a network (e.g., subsystem 350, template source 364, and network 366 described in connection with FIG. 3), as will be further described herein. Because the template is platform-independent, the template can be used to manage the applications or settings of a computing device having any type of platform (e.g., Windows, Unix, etc.) associated therewith.

The template can be the logic (e.g., software logic) for managing the settings of a plurality of applications or operating systems of a computing device. For example, the template can include a number of adjustable parameters for managing the settings of a plurality of applications or operating systems of a computing device, as will be further described herein.

As shown in FIG. 1, method 100 includes creating 112, based on the received template, a profile for managing settings of one of the applications or operating systems of the computing device. The profile can be created by a user via a user interface of the subsystem (e.g., user 362 and user interface 352 described in connection with FIG. 3), as will be further described herein.

The profile can be created based on (e.g., using) the received template. For example, the profile can be created by modifying the adjustable parameters in the received template, e.g., the created profile can include the modified parameters. For instance, the profile can be created by adjusting a number of the adjustable parameters, deleting a number of the adjustable parameters, and/or adding a number of additional parameters to the received template. That is, the created profile can include different, more, and/or fewer parameters than the received template. The modification of the parameters (e.g., the modifications made to the parameters) can be based on, for example, the properties and/or characteristics (e.g., the state) of the one application of the computing device, the one operating system of the computing device, and/or the platform associated with the computing device. Further, the profile can be created by selecting a number of parameters in the template, e.g., the created profile can include the selected parameters. Selecting a parameter can expose additional parameters in the template to the user, and/or may cause other parameters in the template to not be exposed to the user. As an additional example, no modifications may be made to the adjustable parameters in the received template. That is, the created profile can include the same parameters as the received template.

As shown FIG. 1, method 100 includes deploying 114 the created profile to the computing device to manage the settings of the one application or operating system of the computing device. The profile can be deployed to the computing device by the subsystem, as will be further described herein.

The deployment can be a one-time deployment or a recurring deployment. For example, the computing device may include an agent (e.g., software that can run on different platforms), and the subsystem can deploy (e.g., send) the profile to the agent. The agent (e.g., the profile deployed to the agent) can periodically manage the settings of the one application or operating system without an additional deployment of the profile to the agent. Additionally and/or alternatively, if an additional deployment of the profile to the agent occurs, the agent can automatically activate and manage the settings of the one application or operating system again.

As shown in FIG. 1, method 100 includes receiving 116 a report on whether the settings of the one application or operating system of the computing device were successfully managed by the created profile. The report can be received by the subsystem from the computing device, as will be further described herein. The report can allow the user to ensure that the settings are being managed in accordance with the created profile. That is, the report can provide a mechanism for user or system monitoring and/or enforcing the managing of the settings.

The report can include data associated with the settings of the one application or operating system of the computing device gathered by the created profile while managing the settings of the application or operating system. For example, the report can include the deployment status for the profile and/or details regarding the deployment actions of the profile, such the individual commands and results associated with the profile deployment. That is, the report can allow the user to determine the deployment status of the profile and/or adjust the deployment of the profile, e.g., make changes to the profile and/or create new profiles.

Figure 2:
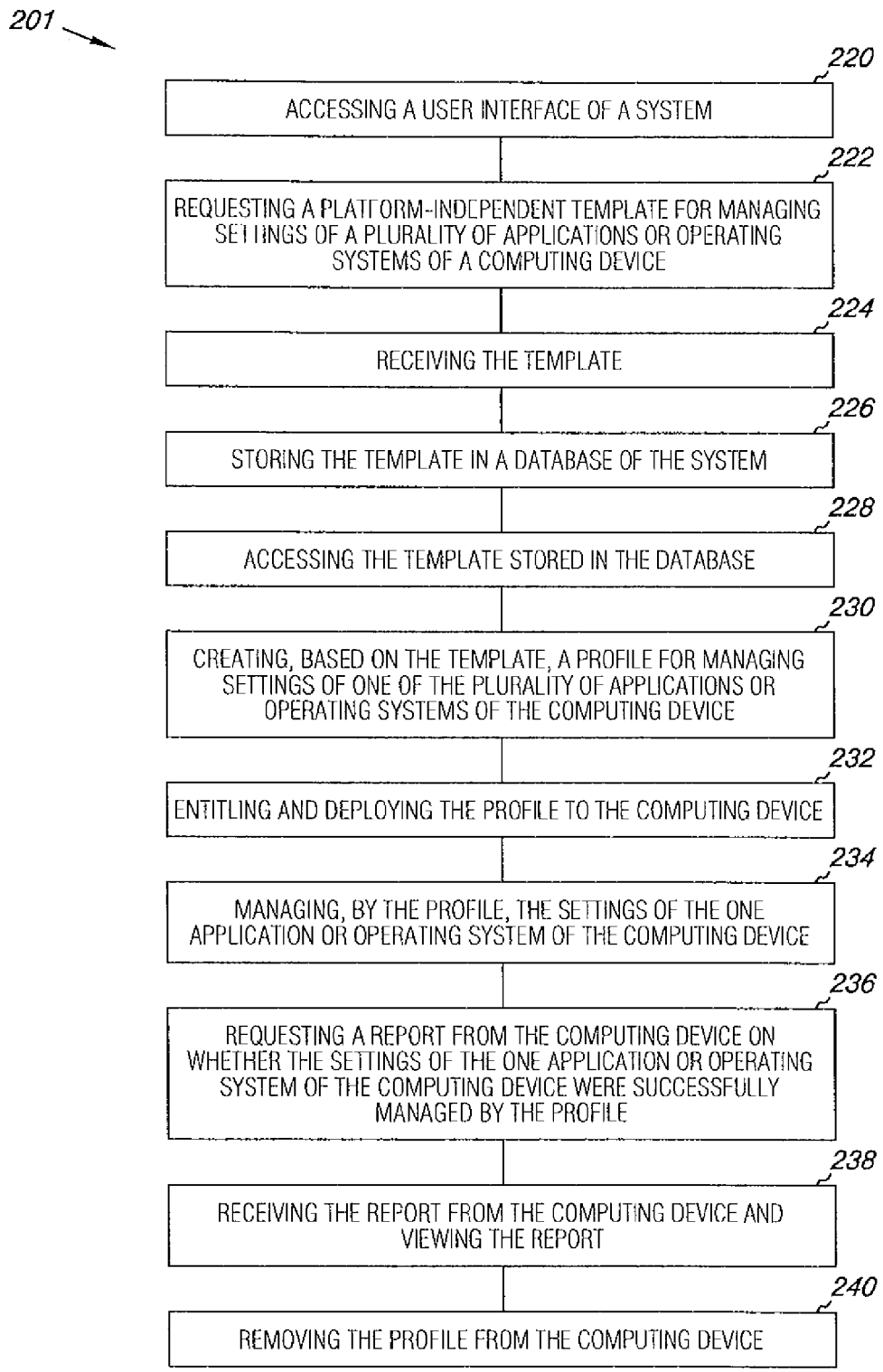
FIG. 2 provides a flow chart illustrating an example of a method for managing settings of a computing device according to the present disclosure.

FIG. 2 provides a flow chart illustrating an example of a method 201 for managing (e.g., controlling and/or changing) settings of a computing device according to the present disclosure. The computing device whose settings are managed can be, for example, a computing device 368-1, 368-2, . . . , 368-N described further herein in connection with FIG. 3.

As shown in FIG. 2, method 201 includes accessing 220 a user interface of a system. The user interface can be, for example, user interface 352 of system 302 described in connection with FIG. 3 and the user interface can be accessed by a user, e.g., user 362 described in connection with FIG. 3, as will be further described herein.

As shown in FIG. 2, method 201 includes requesting 222 a platform-independent template for managing settings of a plurality (e.g., any type) of applications or operating systems of a computing device. The template can be requested from a template source by a subsystem via a network, e.g., template source 364, subsystem 350, and network 368 described in connection with FIG. 3. For example, the subsystem can request the template from the template source in response to receiving a request for the template from the user via the user interface. That is, the user can request the template via the user interface, and the subsystem can then request the template from the template source in response to the user's request. Additionally and/or alternatively, the subsystem can automatically request the template from the template source in accordance with a pre-determined schedule. For instance, the subsystem can request templates from the template source at a pre-determined interval.

The template can be the logic (e.g., software logic) for managing the settings of a plurality of applications or operating systems of a computing device. For example, the template can include a number of adjustable parameters for managing the settings of a plurality of applications or operating systems of a computing device, as will be further described herein. Further, because the template is platform-independent, the template can be used to manage the applications or settings of a computing device having any type of platform (e.g., Windows, Unix, etc.) associated therewith.

As shown in FIG. 2, method 201 includes receiving 224 the template, and storing 226 the template in a database of the system. The template can be received in a single file by the subsystem from the template source via the network, as will be further described herein. The database can be, for example, database 360 deserted further herein in connection with FIG. 3. The template can also be received from a local file system, or uploaded by the user from the user's the system.

As shown in FIG. 2, method 201 includes accessing 228 the template stored in the database. The template stored in the database can be accessed by the user via the user interface. For example, the user interface can display a visual representation of the template stored in the database to the user.

As shown in FIG. 2, method 201 includes creating 230, based on the template, a profile for managing settings of one of the plurality of applications or operating systems of the computing device. The profile can be created by the user via the user interface.

The profile can be created based on (e.g. using) the template. For example, the profile can be created by modifying the adjustable parameters in the template, e.g., the created profile can include the modified parameters. For instance, the profile can be created by adjusting a number of the adjustable parameters in the template, deleting a number of the adjustable parameters from the template, and/or adding a number of additional parameters to the template. That is, the created profile can include different, more, and/or fewer parameters than the template. The modification of the parameters (e.g., the modifications made to the parameters) can be based on, for example, the properties and/or characteristics (e.g., the state) of the one application of the computing device, the one operating system of the computing device, and/or the platform associated with the computing device. Further, the profile can be created by selecting a number of parameters in the template, e.g., the created profile can include the selected parameters. Selecting a parameter can expose additional parameters in The template to the user, and/or may cause other parameters in the template to not be exposed to the user. As an additional example, no modifications may be made to the adjustable parameters in the template. That is, the created profile can include the same parameters as the template.

As shown in FIG. 2, method 201 includes entitling and deploying 232 the profile to the computing device. The profile can he entitled and deployed to the computing device by the subsystem, as will be further described herein. For example, the subsystem can entitle and deploy the profile to the computing device in response to receiving an entitlement and deployment request from the user via the user interface. That is, the user can request the entitlement and deployment of the profile via the user interface, and the subsystem can then entitle and deploy the profile to the computing device in response to the user's request using, for example, a bus or pull mechanism provided by the user interface. Additionally end/or alternatively, the subsystem can entitle and deploy the profile to the computing device automatically upon creation of the profile.

The entitlement and deployment car be a one-time entitlement and deployment, or a recurring entitlement and deployment. For example, the computing device may include an agent (e.g., software that can run on different platforms), and the subsystem can deploy (e.g., send) the profile to the agent. The agent (e.g., the profile deployed to the agent) can periodically manage the settings of the one applicator, or operating system without an additional deployment of the profile to the agent. Additionally and/or alternatively, if an additional deployment of the profile to the agent occurs, the agent can automatically activate and manage the settings of the one application or operating system again.

As shown in FIG. 2, method 201 includes managing 234, by the profile, the settings of the one application or operating system of the computing device. For example, after the profile is deployed to the computing device, the profile can control and/or change the settings of the one application or operating system of the computing device by running through the software logic the profile. That is, by deploying the profile to the computing device, the user can control and/or change the settings of the one application or operating system of the computing device.

As shown is FIG. 2, method 201 includes requesting 236 a report from the computing device on whether the settings of the one application or operating system of the computing device were successfully managed by the profile. The report can be requested from the computing device by the subsystem, as will be further described herein. For example, the subsystem can request the report from the computing device in response to receiving a report request from the user via the user interface. That is, the user can request the report via the user interface, and the subsystem can then request the report from the computing device in response to the user's request. Additionally and/or alternatively, the subsystem can automatically request the report from the computing device in accordance with a pre-determined schedule. Additionally and/or alternatively, the computing device can automatically create and send the report to the subsystem upon completion of the deployment of the profile to the computing device.

As shown in FIG. 2, method 201 includes receiving 238 the report from the computing device and viewing the report. The report can be received from the computing device by the subsystem, as will be further described herein. The report can be stored in the database and viewed by the user via the user interface. For example, the user interface can display a visual representation of the report to the user.

The report and/or the report request can allow the user to ensure that the settings are being managed in accordance with the profile. That is, the report and/or the report request can provide a mechanism for user or system monitoring and/or enforcing the managing of the settings. The report can include data associated with the settings of the one application or operating system of the computing device gathered by the created profile while managing the settings of the one application or operating system. For example, the report can include the deployment status for the profile and/or details regarding the deployment actions of the profile, such as the individual commands and results ran as part of the profile deployment. That is, the report can allow the user to determine the deployment status of the profile and/or adjust the deployment of the profile, e.g., make chances to the profile and/or create new profiles.

As shown in FIG. 2, method 201 includes removing 240 the profile from the computing device. Removing the profile can include, for example, un-entitling and/or deleting the profile from the computing device.

The profile can be removed from the computing device by the subsystem, as will be further described herein. For example, the subsystem can remove the profile from the computing device in response to receiving a request to remove the profile from the user via the user interface. That is, the user can request the removal of the profile via the user interface, and the subsystem can then remove the profile from the computing device in response to the user's request. Additionally and/or alternatively, the subsystem can automatically remove the profile from the computing device in accordance with a pre-determined schedule.

The profile can be removed from the computing device when the management of the one applicaton or operating system is complete and/or not needed. Once the profile is removed from the computing device, the computing device may be unmanaged. Additionally, the profile can include logic that can reset the settings of the one application or operating system to the state the settings were in prior to the deployment of the profile, e.g., to their original condition. For example, prior to the deployment of the profile, the settings (e.g., the original settings) of the one application or operating system can be determined and stored in the database anchor locally in the computing device. After the profile is removed from the computing device, the profile logic can reference the stored settings to reset the settings of the one application or operating system to the state the settings were in prior to the deployment of the profile.

Machine readable and executable instructions and/or logic, which are operable to perform the methods described in connection with FIGS. 1 and/or 2, can be present in whole or in part in the examples of other figures. The present disclosure, however, is not limited to the particular examples given herein.

Figure 3:
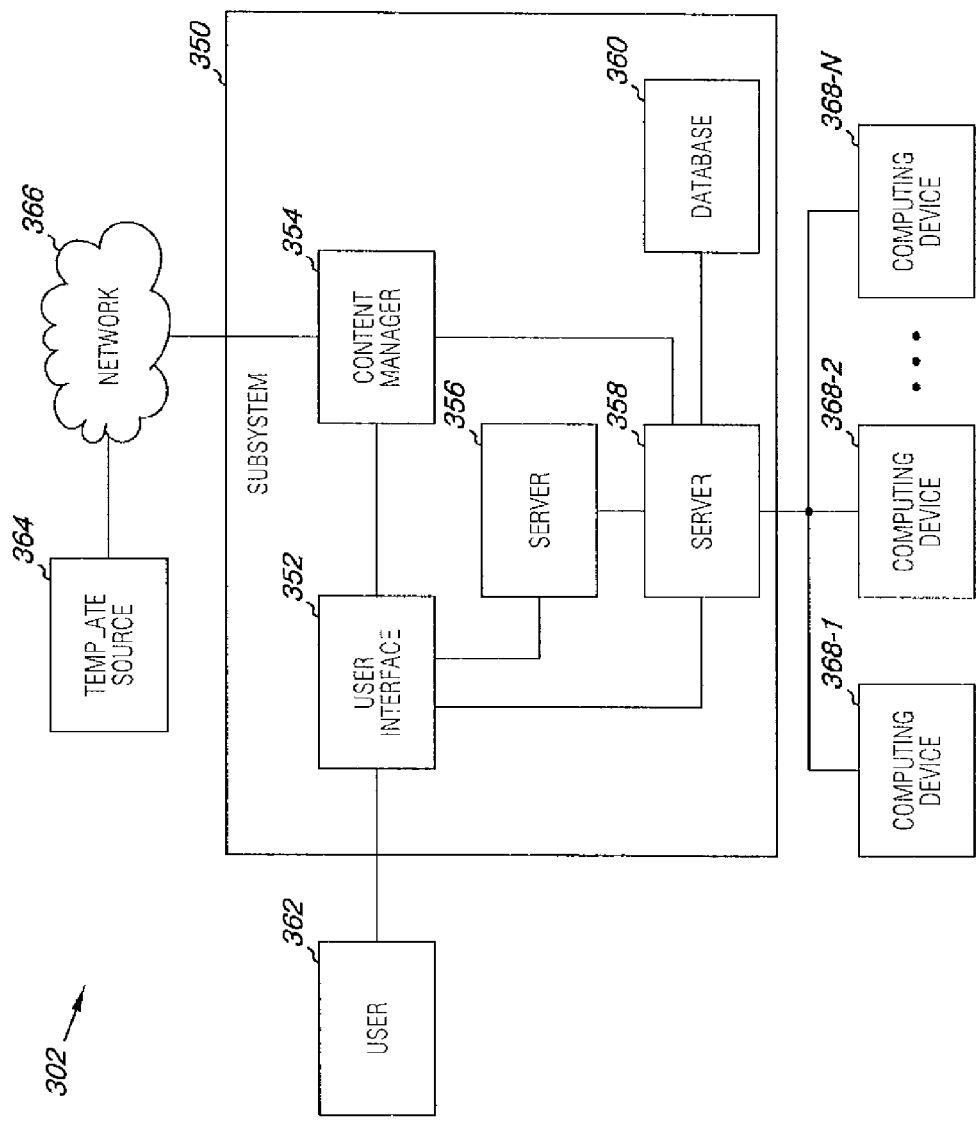
FIG. 3 illustrates a block diagram of an example of a system for managing settings of a computing device according to the present disclosure.

FIG. 3 illustrates a block diagram of an example of a system 302 for managing settings of a computing device (e.g., computing devices 368-1, 368-2, ..., 368-N) according to the present disclosure. That is, system 302 can be used to manage the settings of computing devices 368-1, 368-2, ..., 368-N illustrated in FIG. 3. Computing devices 368-1, 368-2, ..., 358-N can be, for example, desktop computers and/or laptop computers in a network. However, examples of the present disclosure are not limited to a particular type of computing device. Additionally, computing devices 368-1, 368-2, ..., 368-N can have any type of application, operating system, and/or platform (e.g., Windows, Unix, etc.) associated therewith.

As shown in FIG. 3, system 302 includes a user 362, e.g., a personal device of user 362. As an example, the personal device of user 362 can be a cellular telephone, a mobile device (e.g., a mobile phone, a personal digital assistant, etc.), or a computer (e.g., a laptop or desktop computer), among other types of personal devices. User 362 can be, for example, an administrator of system 302 and/or computing devices 368-1, 368-2, ..., 368-N.

As shown in FIG. 3, system 302 includes a subsystem 350 having a user interface 352. User interface 352 can be, for example, a web-based user interface. That is, user 362 can access (e.g., communicate with) user interface 352 via a web-based network, such as for example, the internet (not shown in FIG. 3).

As shown in FIG. 3, system 302 includes a template source 364. Template source 354 can have (e.g., store) a number of platform-independent templates for managing settings of a plurality (e.g., any type) of applications or operating systems of a computing device. The templates can be the logic (e.g., software logic) for managing the settings of a plurality of applications or operating systems of a computing device. For example, the templates can include a number of adjustable parameters for managing the settings of a plurality of applications or operating systems of a computing device. Further, because the template is platform-independent, the template can be used to manage the applications or settings of a computing device having any type of platform (e.g., Windows, Unix, etc.) associated therewith.

As shown in FIG. 3, subsystem 350 includes a content manager 354 coupled to (e.g., in communication with) template source 364 via a network 366. Network 366 can be a private and/or secure (e.g., non-public) network. That is, an authentication mechanism, such as, for example, an account, username and/or password, may be needed to access network 366. Further, network 366 can be, for example, a wide area network (WAN) such as the Internet, a local area network (LAN), a personal area network (PAN), a campus area network (CAN), or metropolitan area network (MAN), among other types of networks.

As used herein, a "network", e.g., network 366, can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations.

A network, e.g., network 366, may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Content manager 354 can send a request to template source 364 via network 366 for the number of templates stored by template source 364. Content manager 354 can send the request to template source 364, for example, in response to user interface 352 receiving a request for the templates from user 362. That is, user 362 can request, via user interface 352, the templates stored by template source 364, and content manager 354 can then request the templates from template source 364 in response to the user's request. Additionally and/or alternatively, content manager 354 can automatically request the templates from template source 364 in accordance with a pre-determined schedule. That is, content manager 354 can request templates from template source 364 at a pre-determined interval.

In response to receiving the request from content manager 354, template source 364 can send the number of templates stored by template source 364 to content manager 354 via network 366. That is, content manager 354 can receive the templates from template source 364 via network 366. Template source 364 can send the templates to content manager 354 in (e.g., as part of) a single file. The single file can also include any images (e.g., the icon and/or logo) associated with the template, and/or localization message bundles.

Additionally and/or alternatively, a list of the number of templates stored by template source 364 can be displayed to user 362 via user interface 352, and user 362 can request a number of templates from the list. Template source 364 can then send the number of templates selected from the list to content manager 354. User 354 can also request all templates of a particular category stored by template source 364 and template source 364 can send all the templates of the particular category stored therein to content manager 354. Content manager 354 can provide an authentication mechanism (e.g., an account, username, and/or password to network 366 so that network 366 can authenticate and authorize the content manager's access to template source 364.

As shown in FIG. 3, subsystem 350 includes a database 360 coupled to a server 358. Server 358 can be, for example, a configuration server, and database 360 can be, for example, a configuration server database. After content manager 354 receives the templates from template source 364, content manager 354 can send (e.g., publish) the templates to database 360 for storage. That is, database 360 can store the templates received from template source 364. Database 360 can also store any control files and/or any other software packages associated with the templates.

User 362 can access, via user interface 352, the templates stored in database 360. For example, user interface 352 can display a visual representation of the templates stored in database 360 to user 362. Further, user 362 can use user interlace 352 to create a number of additional (e.g., new) platform-independent templates for managing settings of a plurality of applications or operating systems of a computing device. The templates created by user 362 can be different than the templates received from template source 364 and stored in database 360.

User 362 can then create, via user interface 352, a number of profiles for managing the settings of one of the plurality of applications or operating systems of computing devices 368-1, 368-2, ..., 368-N. User 362 can create the profiles based on (e.g., using) a number of the templates (e.g., a number of the templates stored in database 360 and/or a number of the templates created by user 362). For example, user 362 can create the profiles by modifying the adjustable parameters in the templates, e.g., the created profiles can include the modified parameters. For instance, user 362 can create the profiles by adjusting a number of the adjustable parameters in the templates, deleting a number of the adjustable parameters from the templates, and/or adding a number of additional parameters to the templates. That is, the created profiles can include different, more, and/or fewer parameters than the received templates. The modification of the parameters (e.g., the modifications made to the parameters) can be based on, for example, the properties and/or characteristics (e.g., the state) of the one application of computing devices 368-1, 368-2, . . . , 368-N, the one operating system of computing devices 368-1, 368-2, . . . , 368-N, and/or the platform associated with computing devices 368-1, 368-2, . . . , 368-N. Further, user 362 can create the profiles by selecting a number of parameters in the templates, e.g., the created profiles can include the selected parameters. Selecting a parameter can expose additional parameters in the templates to user 362, and/or may cause other parameters in the template to not be exposed to user 362. As an additional example, user 362 may not make any modifications to adjustable parameters in the templates. That is, the created profiles can include the same parameters as the templates.

Server 358 can entitle and deploy the created profiles to computing devices 368-1, 368-2, . . . , 368-N via a network and/or a number of satellite servers (not shown in FIG. 3). For example, server 358 can entitle and deploy the profiles to computing devices 368-1, 368-2, . . . , 368-N in response to user interface 352 receiving an entitlement and deployment request from user 362. That is, user 362 can request the entitlement and deployment of the profiles via user interface 352, and server 358 can then entitle and deploy the profiles to computing devices 368-1, 368-2, . . . , 368-N in response to the user's request using, for example, a push or pull mechanism provided by user interface 352. Additionally and/or alternatively, server 358 can entitle and deploy the profiles to computing devices 368-1, 368-2, . . . , 368-N automatically upon the creation of the profiles.

The entitlement and deployment can be a one-time entitlement and deployment, or a recurring entitlement and deployment. For example, computing devices 368-1, 368-2, . . . , 368-N may include an agent (e.g., software that can run on different platforms), and server 358 can deploy (e.g., send) the profile to the agent. The agent (e.g., the profile deployed to the agent) can periodically manage the settings of the one application or operating system without an additional deployment of the profile to the agent. Additionally and/or alternatively, if an additional deployment of the profile to the agent occurs, the agent can automatically activate and manage the settings of the one application or operating system again.

After the profiles are deployed to computing devices 368-1, 368-2, . . . , 368-N, the profiles can manage the settings of the one application or operating system of computing devices 368-1, 368-2, . . . , 368-N. For example, after the profiles are deployed to computing devices 368-1, 368-2, . . . , 368-N, the profiles can control and/or change the settings of the one application or operating system of computing devices 368-1, 368-2, . . . , 368-N by running through the software logic in the profiles. That is, by deploying the profiles to computing devices 368-1, 368-2, . . . , 368-N, user 362 can control and/or change the settings of the one application or operating system of computing devices 368-1, 368-2, . . . , 368-N.

As shown in FIG. 3, subsystem 356 includes an additional server 356. Server 356 can be, for example, a messaging server. Server 356 can send a request, via a network and/or a number of satellite servers (not shown in FIG. 3), to computing devices 368-1, 368-2, . . . , 368-N for a report on whether the settings of the one application or operating system of computing devices 368-1, 368-2, . . . , 368-N were successfully managed by the deployed profiles. Server 356 can send the request to computing devices 368-1, 368-2, . . . , 368-N, for example, in response to use interface 352 receiving a report request from user 352. That is, user 362 can request the report via user interface 352, and server 356 can then request the report from computing devices 368-1, 368-2, . . . , 368-N N in response to the user's request. Additionally and/or alternatively, server 356 can automatically request the report from computing devices 368-1, 368-2, . . . , 368-N in accordance with a pre-determined schedule.

In response to receiving the report request from server 356, computing devices 368-1, 368-2, . . . , 368-N can send the report to server 356 via the network and/or satellite servers (not shown in FIG. 3). Additionally and/or alternatively, computing devices 368-1, 368-2, . . . , 368-N can automatically create and sand the report to server 356 upon completion of the deployment of the profiles to computing devices 368-1, 368-2, . . . . , 358-N. That is, server 356 can receive the report from computing devices 368-1, 368-2, . . . , 368-N. The received report can be stored in database 360 and viewed by user 362 via user interface 352. For example, user interface 362 can display a visual representation of the report to user 362. The report can also be a part of an aggregation report across computing devices 368-1, 368-2, . . . , 368-N.

The report and/or the report request can ensure that the settings are being managed in accordance with the profile. That is, the report and/or the report request can provide a mechanism for monitoring and/or enforcing the managing of the settings. The report can include data associated with the settings of the one application or operating system of computing devices 368-1, 368-2, . . . , 368-N gathered by the created profile while managing the settings of the one application or operating system. For example, the report can include the deployment status for the profile and/or details regarding the deployment actions of the profile, such as the individual commands and results ran as part of the profile deployment.

When management of the one application or operating system of computing devices 368-1, 368-2, . . . , 368-N is complete and/or no longer needed, server 358 can remove the profile from computing devices 368-1, 368-2, . . . , 368-N. For instance, server 358 can send a command to computing devices 368-1, 368-2, . . . , 368-N to remove the profile, and computing devices 368-1, 368-2, . . . , 368-N can remove the profile in response to receiving the command.

For example, server 358 can remove the profile from computing devices 368-1, 368-2, . . . , 368-N in response to user interface 352 receiving a request from user 352 to remove the profile. That is, user 362 can request the removal of the profile via user interface 352, server 358 can sand a command to computing devices 368-1, 368-2, . . . , 368-N to remove the profile in response to the user's request, and computing devices 368-1, 368-2, . . . , 368-N can remove the profile in response to receiving the commend. Additionally and/or alternatively, server 358 can automatically remove the profile from computing devices 368-1, 368-2, . . . , 368-N in accordance with a pre-determined schedule. That is, server 358 can automatically send a command to computing devices 368-1, 368-2, . . . , 368-N to remove the profile, and computing devices 368-1, 368-2, . . . , 368-3 can remove the profile in response to receiving the command.

Removing the profile from computing devices 368-1, 368-2, . . . , 368-N can include, for example, un-entitling and/or deleting the profile from computing devices 368-1, 368-2, . . . , 368-N. For example, the command to remove the profile can include a command to un-entitle and/or delete the profile from computing devices 368-1, 368-2, . . . , 368-N. Computing devices 368-1, 368-2, . . . , 368-N may be unmanaged once the profile is removed. Additionally, the profile can include logic that can reset the settings of the one application or operating system to the state the settings were in prior to the deployment of the profile, e.g., to their original condition. For example, prior to the deployment of the profile, the settings (e.g., the original settings) of the one application or operating system can be determined and stored in database 360 and/or locally in computing devices 368-1, 368-2, . . . , 368-N. After the profile is removed from computing, devices 368-1, 368-2, . . . , 368-N, the profile logic can reference the stored settings to reset the settings of the one application or operating system to the state the settings were in prior to the deployment of the profile.

Figure 4:
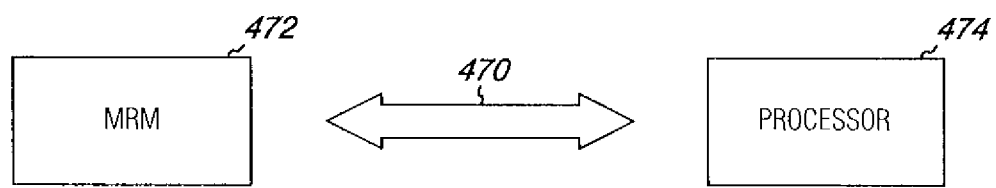
FIG. 4 illustrates a block diagram of an example of a machine readable medium in communication with processor resources according to the present disclosure.

FIG. 4 illustrates a block diagram of an example of a machine readable medium 472 in communication with processor 474 resources according to the present disclosure. A machine (e.g., a computing device) can include and/or receive a tangible non-transitory machine readable medium (MRM) 472 storing a set of machine readable instructions (e.g., software) for managing settings of a computing device, as described herein. As used herein, processor 474 resources can include one or a plurality of processors such as in a parallel processing system. The machine readable medium 472 can include volatile and/or non-volatile memory such as random access memory (RAM), magnetic memory such as a hard disk, floppy disk, and/or tape memory, a solid state drive (SSD), flash memory, phase change memory, etc.

The MRM 472 can be in communication with the processor 474 resources via a communication path 470. The communication path 470 can be local or remote to a machine associated with the processor 474 resources. Examples of a local communication path 470 can include an electronic bus internal to a machine such as a computer where the MRM 472 is one of volatile, non-volatile, fixed, and/or removable storage medium in communication with the processor 474 resources via the electronic bus. Examples of such electronic buses can include Industry Standard Architecture (ISA), Peripheral Component interconnect (PCI), Advanced Technology Attachment (ATA), Small Computer System interface (SCSI), Universal Serial Bus (USB), among other types of electronic buses and variants thereof.

In other examples, the communication path 470 can be such that the MRM 472 is remote from the processor 474 resources such as in the example of a network connection between the MRM 472 and the processor 474 resources (e.g., the communication path 470 can be a network connection). Examples of such a network connection can include a local area network (LAN), a wide area network (WAN), a personal area network (PAN), the Internet, among other examples of networks. In such examples, the MRM 472 may be associated with a first machine (e.g., a server) and the processor 474 resources may be associated with a second machine a computing device). The first and second machines can be in communication via a networked communication path 470.

Although specific examples have been illustrated and described herein, those of ordinary skill in the art will appreciate that an arrangement calculated to achieve the same results can be substituted for the specific examples shown. This disclosure is intended to cover adaptations or variations of a number of examples of the present disclosure. It is to be understood that the above description has been made in an illustrative fashion, and not a restrictive one. Although specific examples have been illustrated and described herein, other component arrangements, instructions, and/or device logic can be substituted for the specific examples shown. Combination of the above examples, and other examples not specifically described herein, will be apparent to those of skill in the art upon reviewing the above description. The scope of a number of examples of the present disclosure includes other applications in which the above structures and methods are used. Therefore, the scope of a number of examples of the present disclosure should be determined with reference to the appended claims, alone with the full range of equivalents to which such claims are entitled.

In the foregoing Detailed Description, some features are grouped together in a single example for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less then all features of a single disclosed example. Thus, the following claims are hereby incorporated into the Detailed Description, with each claim standing on its own as a separate example.

What is claimed:

1. A method comprising:
receiving, at a subsystem, a platform-independent template to manage settings of a plurality of distinct operating systems associated with a corresponding plurality of computing devices linked to the subsystem;
creating, based on the received template, a profile to manage settings of one of the plurality of operating systems of a computing device of the plurality of computing devices linked to the subsystem, wherein the created profile includes different parameters than the received template and wherein the different parameters are selected based on characteristics of the operating system of the computing device;
sending the created profile to an agent on the computing device for modification of the settings of the one operating system of the computing device; and
receiving, at the subsystem, a report from the agent on a status of a deployment of the created profile on the computing device, details of individual commands associated with the deployment of the created profile, results of the individual commands, and data associated with the settings of the operating system of the computing device gathered by the agent on the computing device.

2. The method of claim 1, wherein:
the received template includes a number of adjustable parameters for managing settings of the plurality of distinct operating systems; and
creating the profile for managing the settings of the one of the plurality of operating systems of the computing device includes adjusting a portion of the number of adjustable parameters in the received template.

3. The method of claim 1, wherein:
the received template includes a number of parameters for managing settings of the plurality of applications or operating systems of the computing device; and
creating the profile for managing the settings of the one of the plurality of distinct operating systems includes deleting a number of the number of adjustable parameters from the received template.

4. The method of claim 1, wherein creating the profile for managing the settings of the one of the plurality of distinct operating systems includes adding a number of parameters for managing the settings of the one operating system of the computing device to the received template.

5. The method of claim 1, wherein the method includes automatically receiving the report on whether the settings of the one operating system of the computing device were successfully managed by the created profile upon completion of the deployment of the created profile to the computing device.

6. The method of claim 1, wherein the method includes receiving the template in a single file.

7. The method of claim 1, comprising determining and storing an initial setting of the plurality of distinct operating systems on corresponding plurality of computing devices linked to the subsystem prior to deploying the created profile to the computing device.

8. The method of claim 7, comprising removing the created profile from the computing device responsive to a command that the managing settings is complete.

9. The method of claim 8, comprising retrieving the initial setting and restoring the one operating system of the computing device to the initial setting.

10. The method of claim 1, wherein the report includes an aggregation of data associated with the settings of the one operating system of a plurality of computing devices.

11. A system comprising:
a database to store a number of platform-independent templates to manage settings of a plurality of distinct operating systems associated with a plurality of computing devices linked to a subsystem;
the subsystem including;
a user interface to permit a user to:
access the number of templates stored in the database; and
create a profile to manage settings of one of the plurality of operating systems of a computing device of the plurality of computing devices linked to the subsystem, wherein the created profile is based on a portion of the number of templates stored in the database, a platform associated with the computing device, and the one operating system of the computing device, wherein the created profile includes different parameters than the portion of the number of templates upon which the created profile is based, and wherein the different parameters of the created profile are selected based on characteristics of the operating system of the computing device;
a configuration server to:
send the created profile to an agent on the computing device for modification of the settings of the one operating system of the computing device; and
a messaging server to:
send a request to the agent for a report including a status of a deployment for the created profile, details of individual commands associated with the deployment of the created profile, results of the individual commands, and data associated with the settings of the one operating system of the computing device gathered by the agent on the computing device; and
receive the requested report from the agent on the computing device.

12. The system of claim 11, wherein the system includes a content manager to:
receive the number of templates via a private network; and
send the received number of templates to the database for storage.

13. The system of claim 11, wherein the user interface permits the user to:
create a number of additional platform-independent templates to manage settings of a plurality of distinct operating systems associated with a plurality of computing devices linked to a subsystem; and
create the profile for managing the settings of the one operating system of the computing device based on the number of additional templates.

14. A non-transitory computer readable medium storing a set of machine readable instructions for managing settings of a computing device, which when executed by a machine, cause the machine to:
request, at a subsystem, a platform-independent template to manage settings of a plurality of distinct operating systems associated with a corresponding plurality of computing devices linked to the subsystem;
modify, at the subsystem, the template to create a profile to manage settings of one of the plurality of operating systems of a computing device of the plurality of computing devices linked to the subsystem, wherein the created profile includes different parameters than the requested template and wherein the different parameters are selected based on characteristics of the operating system of the computing device;
send the created profile to an agent on the computing device for modification of the settings of the one operating system of the computing device;
ensure the settings of the one operating system of the computing device are managed in accordance with the created profile by sending a request from the subsystem for a report from the agent on the computing device, wherein the requested report includes a status of a deployment for the created profile, details of individual commands associated with the deployment of the created profile, results of the individual commands, and data associated with the settings of the one operating system of the computing device gathered by the agent on the computing device.

15. The medium of claim 14, wherein:
the deployment of the created profile to the computing device is a one-time deployment to an agent on the computing device; and
the agent periodically manages the settings of the one operating system of the computing device without an additional deployment of the created profile.

16. The medium of claim 14, wherein:
the instructions cause the machine to perform an additional deployment of the created profile to an agent on the computing device; and
the agent, in response to the additional deployment, automatically activates and manages the settings of the one operating system of the computing device.

17. The medium of claim 14, wherein the template is requested in accordance with a pre-determined schedule or in response to a request received from a user of the subsystem.

18. The medium of claim 14, wherein the instructions cause the machine to reset the settings of the one operating system of the computing device to a state the settings were in prior to the deployment of the profile to the computing device.

19. The medium of claim 18, wherein the state the settings were in prior to the deployment of the profile is retrieved from the computing device and wherein the reset is responsive to a deletion of the created profile from the computing device according to a predetermined schedule.

* * * * *